July 15, 1969     P. A. RUBEL     3,455,761

POLYMERIC WELDING PROCESS AND APPARATUS

Filed Feb. 18, 1966     3 Sheets-Sheet 1

United States Patent Office 3,455,761
Patented July 15, 1969

3,455,761
POLYMERIC WELDING PROCESS AND
APPARATUS
Peter A. Rubel, Lexington, Mass., assignor to Cabot Corporation, Boston, Mass., a corporation of Delaware
Filed Feb. 18, 1966, Ser. No. 528,595
Int. Cl. B29c 27/01, 1/02
U.S. Cl. 156—294                                          11 Claims

ABSTRACT OF THE DISCLOSURE

An apparatus having a particular die assembly which is useful in the thermal welding of polymeric materials and a process for thermally welding said polymeric materials.

The present invention relates in general to heating apparatus and more specifically to novel apparatus for heating essentially cylindrical shapes.

In recent years the use of piping and tubing comprising polymeric materials has risen greatly. Said materials often display characteristics of chemical inertness, thermal stability and the like which particularly suit such materials for use in pipe and tubing in which corrosive chemicals such as acids and caustics are transported. Cross-linked or cured polymers of α-mono-olefins, such as cross-linked polyethylene, have been found to be particularly valuable materials for tubing and piping systems.

One of the methods by which pipe, tubing and other elongate shapes comprising such materials are joined comprises broadly the steps of (1) interspersing between the articles to be joined a thermally activatable welding composition and (2) applying sufficient heat to the articles and said composition to (a) flux the composition and/or (b) cure the composition to each of the articles thereby effecting a welded joint. It is generally preferable that the welding be accomplished under pressure, i.e. that the mating surfaces of the articles be continually urged toward each other during the heating step. One such method of joining cross-linked polymeric articles hereinafter referred to as "thermal welding" is more fully described in copending U.S. application Ser. No. 457,448 to P. A. Rubel, filed May 20, 1965 now U.S. Patent No. 3,406,055.

During the thermal welding of polymeric pipe shapes, particularly when pipe is welded into pipe fittings such as L's, couplings, T's, etc., it has been noted that after the heating step and upon or after cooling the terminal portion of the mating surfaces, the fitting often tends to splay or peel outwardly from the pipe or welding composition. Obviously, this phenomenon can be most deleterious to weld quality. However, in accordance with the present invention this problem has been substantially entirely eliminated.

It is a principal object of the present invention to provide a novel heating apparatus.

It is another object of the present invention to provide novel apparatus for the heating of essentially cylindrical polymeric shapes.

It is still another object of the present invention to provide novel heating apparatus for the heating of essentially cylindrical polymeric shapes.

It is still another object of the present invention to provide unusually adaptable and flexible heating apparatus for the heating of essentially cylindrical polymeric shapes.

Other objects will in part be obvious and will in part appear hereinafter.

A better understanding of the apparatus of the present invention can be had when reference is made to the drawings forming part hereof wherein.

Figure 1:
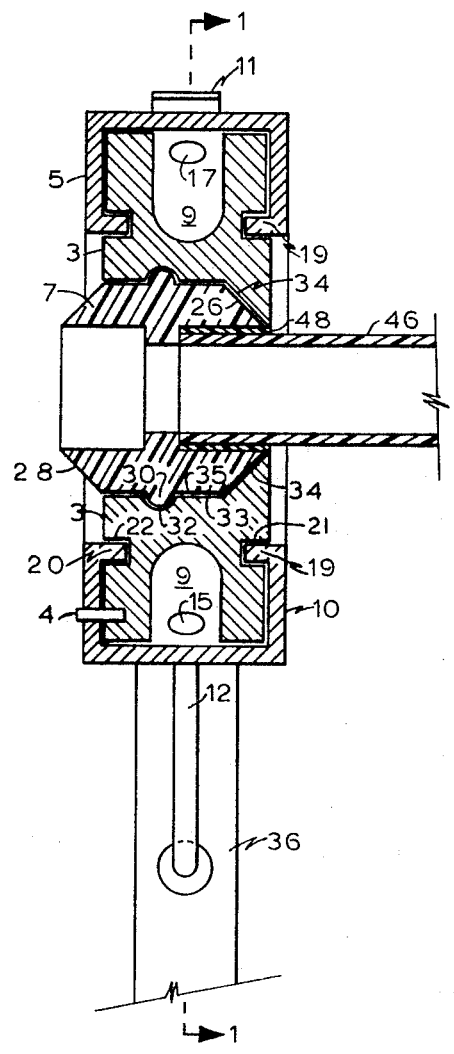
FIGURE 1 is a schematic diagrammatic longitudinal section of the apparatus shown in operable relationship with a pipe/coupling assembly.
Figure 4:
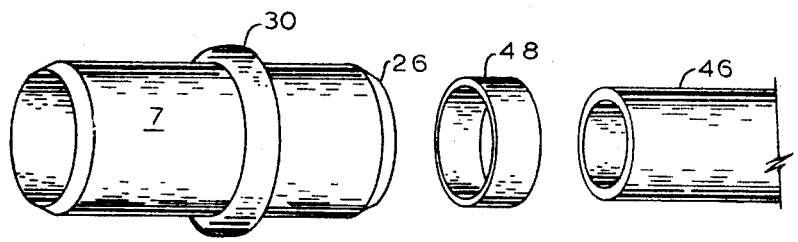
FIGURE 4 is a typical schematic diagrammatic view showing the relationship of cured polymeric pipe, welding composition and coupling prior to assembly.
Figure 2:
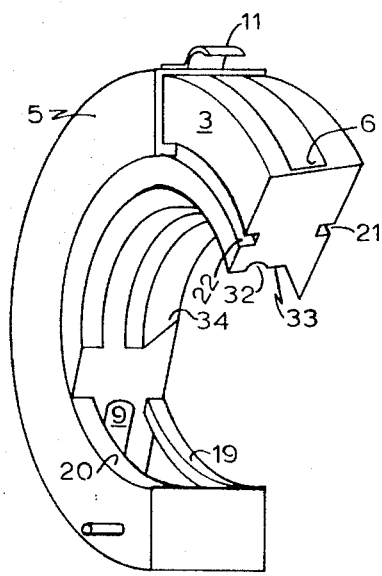
FIGURE 2 is a schematic diagrammatic partial side view of the apparatus illustrated in FIGURE 1 wherein die half 3 is partially inserted in channel 5.

Referring now to FIGURES 1 and 2, the heating apparatus operates broadly as follows: Die halves 3 are inserted into channel members 5. Said die halves are contoured to fit the exterior surfaces of the particular fitting to be welded, in this case, fitting 7. Moreover, said die halves are provided with recesses 6 which together with channel members 5 form combustion chamber 9. The two channel member/die half assemblies 10 are maintained in planar pivotal relationship by hinge assembly 11. A fuel and an oxygen-containing gas mixture is charged into combustion chambers 9 through gas inlets 15. The combustion of the fuel/oxygen-containing mixtures therein heats the die halves and the combustion products are exited through outlets 17. Much of the heat thus produced is transferred principally by conduction into fitting 7.

The materials from which the apparatus is fabricated are obviously subject to wide variation. Of course, it is all important that said materials withstand the temperatures to which the apparatus is subjected during operations. Thus materials such as stainless steel, copper, nickel, aluminum, brass and the like are generally satisfactory. Moreover, it should be noted that often it is desirable to deposit or plate an extremely hard and smooth material such as chrome or nickel on to the surfaces of said die halves.

Channel members 5 can be of any convenient design provided that said members engage die halves 3 in slideable relationship. In FIGURES 1 and 2, for instance, channel members 5 are provided with ribs 19 and 20 which engage mating recesses 21 and 22 in die halves 3. Obviously, other methods for providing said slideable relationship can be utilized; for instance recesses can be provided in channel members 5 and lugs or ribs on die halves 3. It is important that the slideable relationship between the channel members and the die halves be preserved because said relationship allows for an unusually facile replacement of dies of differing contours and sizes. After insertion of the die half into the channel member, said die half is secured by any suitable means such as locking pin 4. It will be noted that inlets 15 and outlets 17 are positioned substantially terminally on each channel member. Said terminal positioning of said inlets and outlets is generally desirable in order to provide a maximum combustion chamber length.

Figure 3:
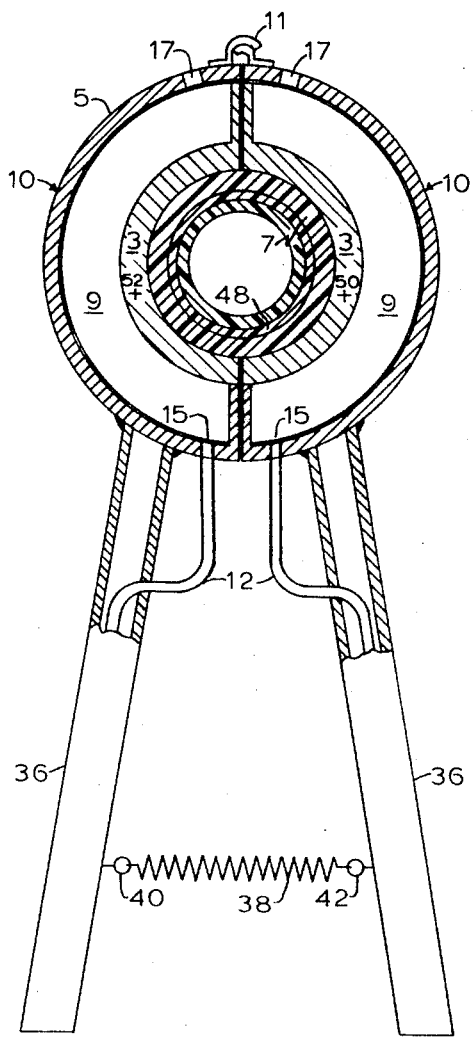
FIGURE 3 is a schematic diagrammatic cross-sectional view of the complete apparatus and pipe/coupling assembly of FIGURE 1 taken along line 1—1 thereof.

The design of die halves 3 is not particularly critical provided that good mating of the die faces 33 and the exterior surface 35 of the fitting occurs when said die halves are closed. It will be understood that many polymeric compositions tend to swell somewhat upon heating, thereby obviating minor imperfections in the die face 33/fitting surface 35 relationship. However, with a view to solving the peeling problem mentioned hereinbefore, it has been further discovered that the use of fittings of certain designs in conjunction with the apparatus of the present invention substantially eliminates said problem. Referring now to FIGURES 1-3, polymeric fitting 7 is provided with chamfered edges 26 and 28 and said die members are provided with a circumferential positioning rail 30. Rail 30 engages channel 32 in die half 3 thereby preventing substantial movement of the die half relative to the fitting and even more importantly assuring a good bearing between chamfer 26 and coinciding mating surfaces 34 of the die half despite the tendency of the polymeric material to undergo dimensional changes during operations. Said good bearing of die surface 34 upon chamfered surface 26 is important.

The angle of chamfer can vary substantially; however, it has been found that a chamfer angle of between about 20° and about 60° for the die faces with respect to the longitudinal axis of the fitting is generally satisfactory.

It is important that many fitting and die designs can provide the positioning and stabilizing effects of rail 30 and channel 32. For instance a plurality of such ribs can be provided and/or the ribbing can be accomplished on the die face while channels are provided in the fitting. However, a single rib centrally positioned on a coupling fitting has been found to be entirely satisfactory. For non-linear types of fittings, however, such as L's, T's, Y's and the like it will generally be necessary to provide at least one positioning rail or channel to service each chamfered terminus.

In general it will be preferred to provide handles 36 in order to operate the apparatus conveniently. Moreover, means to continually urge assemblies 10 towards a closed position is very advantageous during operations. In FIGURE 3, said means comprises spring means 38 and supports 40 and 42. Obviously, many other structures within the purview of the art can provide such action.

The following example illustrates a method of operation of the apparatus of the present invention and is not to be construed as limiting the scope of the invention.

Example

Referring now to the drawings, the terminus of polymeric pipe 46 is overlaid with tape 48 of about .020" thickness and is then inserted into coupling 7. The pipe and coupling comprise substantially fully cured compositions comprising high density (.960) polyethylene filled with about 80 parts by weight of said polyethylene of carbon black. The tape composition comprises by weight about 100 parts high density polyethylene, 50 parts carbon black and about 3 parts of dicumyl peroxide. The resulting joint can be described as a press fit. Next, a gas mixture comprising about 4% propane and 96% air is charged at a rate of about 20 s.c.f.h. from an outside source (not shown) through handles 36, conduits 12, inlets 15 and thence into combustion chambers 9. Ignition of said gases is accomplished by positioning a lighted taper near outlets 17. Upon ignition the resulting flame burns within combustion chambers 9. The temperature of die walls at points 50 and 52 (FIGURE 2) reaches and stabilizes at about 350° C. The channel members are then opened about the axis of hinge 11 and then closed about the coupling in such a manner that rail 30 engages channel 32. Spring 38 is then tensioned between 40 and 42. After about 3 minutes, the apparatus is removed from the coupling and the joint is cooled to about room temperature. Subsequent examination of the resulting weld after longitudinal sectioning of the pipe and coupling shows a substantially fully cured weld. Moreover, no peeling of the weld is noted.

Obviously, many changes can be made in the above description and example without departing from the scope of the invention. For instance, die shapes other than the one specifically shown can be utilized, such as for example a straight section through the bearing surface. However, the combination of chamfered fitting terminus and a die positioning means is generally very much preferred.

Moreover, the apparatus can be externally insulated in order to reduce heat losses during operations. Furthermore, a plurality of fuel gas/oxygen containing gas mixture inlets and outlets communicating with the combustion chamber can be utilized in order to insure even combustion within said chamber. Also, various devices known to the art can be utilized for the purposes of flame anchoring, modification, temperature control and the like.

Moreover, various means for determining the temperature of the die halves are available. For instance certain thermochromic materials which change color with respect to temperature can be utilized during operations.

Finally, it should be understood that for the purposes of the present invention, the phrase "essentially cylindrical" refers not only to hollow polymeric shapes having cross-sections which bear a geometric configuration conforming strictly to the mathematical equations for circles but also to solid shapes such as rod stock or, in addition, to those cross-sections which substantially approach the configuration of a circle. Thus, objects comprising cross-sections which are ovoid in nature, or which describe substantially regular polygons having more than about 5 sides (and which, therefore, approach circular configuration) can obviously be suitably welded by the apparatus of the present invention.

Accordingly, it is intended that the above disclosure be regarded as illustrative and as not limiting the scope of the invention.

What is claimed is:

1. Apparatus for thermal welding which comprises die assemblies and means to maintain said assemblies in planar relationship to one another, each die assembly comprising:
    (a) an essentially arcuate die means the innermost surfaces of which are contoured to engage and contact surfaces of a polymeric workpiece,
    (b) a channel member adapted to engage die means in slideable relationship to form an enclosed chamber between said die means and said channel member,
    (c) means to introduce oxygen containing gas and combustible gas into said chamber, and
    (d) means to exit the combustion product gases from said chamber at a point substantially removed from said inlet means.

2. The apparatus of claim 1 wherein said slideable relationship between said die means and said channel member is provided by a mating rib and groove arrangement in the die means and channel member.

3. The apparatus of claim 1 wherein the innermost surface of each of said die members is provided with at least one positioning structure adapted to engage with and mate to at least one positioning structure on a polymeric work piece.

4. The apparatus of claim 1 wherein the innermost surface of each of said die members is provided with a chamfered terminus adapted to be in contact with a mating chamfered terminus on a polymeric work piece.

5. The apparatus of claim 4 wherein the chamfered terminus on each of said die members subtends an angle of between about 20° and about 60° with respect to the longitudinal axis of the die means.

6. The apparatus of claim 1 wherein there is provided locking means to maintain said die means and said channel member in the fully engaged position.

7. The apparatus of claim 1 wherein said die assemblies are provided with means to urge said assemblies together in planar relationship.

8. The apparatus of claim 7 wherein said urging means comprises an arm extending from each of said die assemblies and spring means interconnecting and tensioning said arm means.

9. Apparatus for thermally welding polymeric pipe fittings to polymeric pipe which comprises two die assemblies and means to maintain said assemblies in planar relationship to one another, each die assembly comprising:
    (a) a semi-circular die means the innermost surface of said die means contoured to engage and contact surfaces of a polymeric pipe fitting, the outermost surface of said die means being circumferentially recessed, and (b) a channel member adapted to engage said die means in slideable relationship and provide an enclosure of said recess,
(c) oxygen containing gas and combustible gas inlet means communicating with the enclosed space formed by said recess and said channel member and,
(d) means to exit the combustion product gases from said space from a point substantially removed from said inlet means.

10. In a process for thermally welding a cured polymeric pipe shape and a cured polymeric fitting which comprises interspersing between said pipe shape and said fitting a thermally activatable welding composition, mating said pipe shape and said fitting to form a joint and thereafter applying sufficient heat to said fitting to effect the weld, the improvement which comprises:
 (a) providing a chamfered terminus on said fitting,
 (b) providing a positioning means comprising a circumferentially disposed groove or rib on said fitting,
 (c) positioning a heating means about the circumference of said fitting, said means having surfaces adapted to engage and bear upon said positioning means and said chamfered terminus and,
 (d) heating the mated joint to a temperature sufficient to cure said composition, thereby providing a substantially peel-free weld.

11. The process of claim 10 wherein said cured pipe shape and fitting comprise polyethylene.

References Cited
UNITED STATES PATENTS

| | | | |
|---|---|---|---|
| 2,372,737 | 4/1945 | Phillips | 156—306 X |
| 2,759,090 | 8/1956 | Frye | 156—579 X |
| 2,878,038 | 3/1959 | Noland | 156—304 X |
| 3,035,958 | 5/1962 | Wilkins | 156—306 X |
| 3,281,295 | 10/1966 | Capucio | 156—293 X |

HAROLD ANSHER, Primary Examiner

U.S. Cl. X.R.

156—304, 306, 381, 499